United States Patent [19]

Baiker

[11] Patent Number: 4,941,680
[45] Date of Patent: Jul. 17, 1990

[54] MULTIPURPOSE CHASSIS FOR COMMERCIAL AND SPECIAL VEHICLES

[76] Inventor: Walter Baiker, Chälenstrasse 2, 8433 Weiach, Switzerland

[21] Appl. No.: 297,867
[22] PCT Filed: Apr. 26, 1988
[86] PCT No.: PCT/CH88/00082
 § 371 Date: Dec. 15, 1988
 § 102(e) Date: Dec. 15, 1988
[87] PCT Pub. No.: WO88/08384
 PCT Pub. Date: Nov. 3, 1988

[30] Foreign Application Priority Data

Apr. 29, 1987 [CH] Switzerland .......................... 1644/87

[51] Int. Cl.⁵ .............................................. B62D 21/18
[52] U.S. Cl. ..................................... 280/793; 280/785; 280/789
[58] Field of Search ............... 280/784, 785, 793, 794, 280/789; 180/9.1, 321

[56] References Cited

U.S. PATENT DOCUMENTS

| | | | |
|---|---|---|---|
| 2,835,506 | 5/1958 | Schilberg | 280/794 |
| 3,325,180 | 6/1967 | Bandini | 810/321 |
| 4,361,242 | 11/1982 | Dion et al. | 180/9.1 |

FOREIGN PATENT DOCUMENTS

| | | | |
|---|---|---|---|
| 0001176 | 3/1979 | European Pat. Off. | |
| 278479 | 8/1988 | European Pat. Off. | 280/785 |
| 874406 | 4/1953 | Fed. Rep. of Germany. | |
| 1064235 | 5/1954 | France | 280/793 |
| 2009680 | 6/1979 | United Kingdom. | |
| 1586529 | 3/1981 | United Kingdom. | |

Primary Examiner—Kenneth R. Rice
Attorney, Agent, or Firm—Walter C. Farley

[57] ABSTRACT

For commercial and special vehicles, such as e.g. weapon transporters, mobile radar stations, mobile satellite control stations and mobile cranes, which must carry very considerable weight, very robust chassis are required.

The inventive chassis (1) has a so-called box-frame construction. It comprises a lower and an upper carrier plate (2, 3), which are reinforced and joined by reinforcing elements (12) located between them. This construction leads to an enormous load bearing capacity and extremely high rigidity against twisting or torsion in the case of a reduced height of chassis (1). Unlike the case of conventional chassis constructions with an overall height of 30-40 cm, minimum heights of approximately 10 cm are possible here. Through covering the outer faces of the chassis with vertical cover plates, an additional reinforcement is obtained.

These measures permit a configuration which, even when using large wheels, makes it possible to mount the chassis at a very low level. As a result of the inventive chassis, it is possible to use telescopic axle suspensions, such as are described in Swiss patent application 531/87. This makes it possible to adjust the vehicle position even when travelling and without using additional means. In addition, a construction with relatively low weight is obtained.

6 Claims, 4 Drawing Sheets

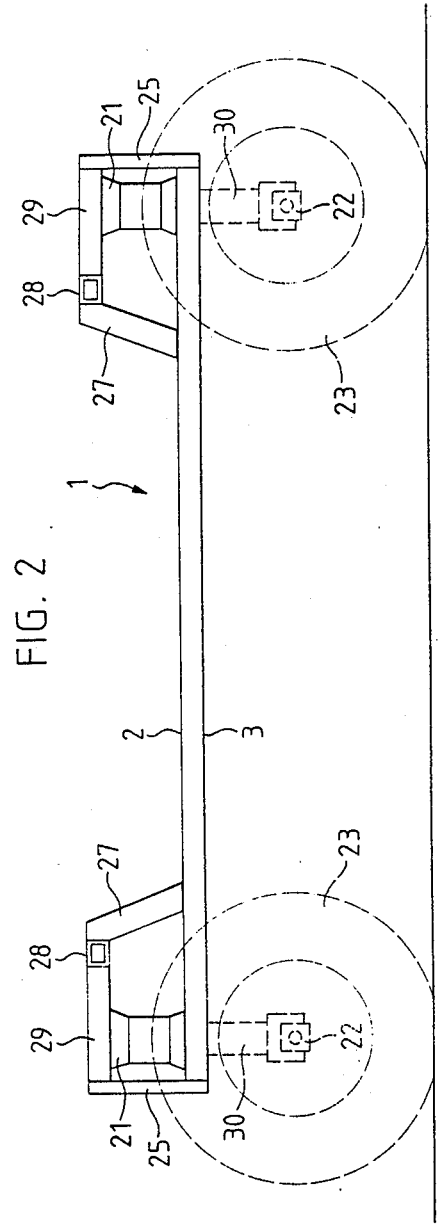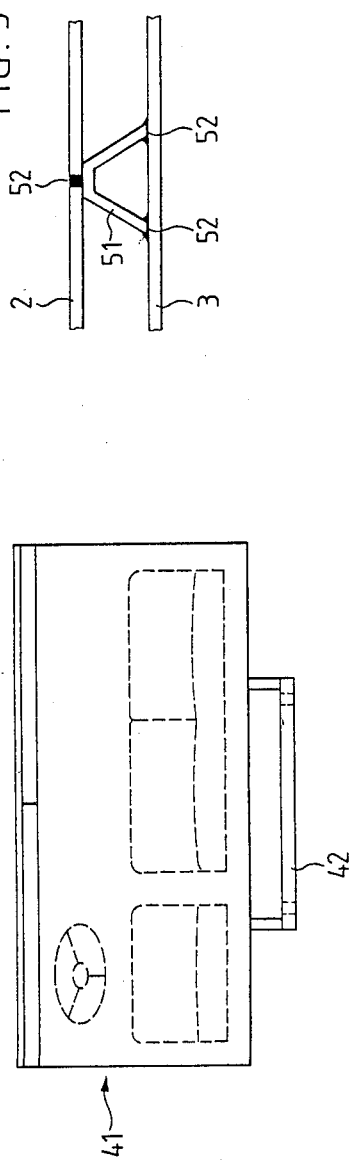

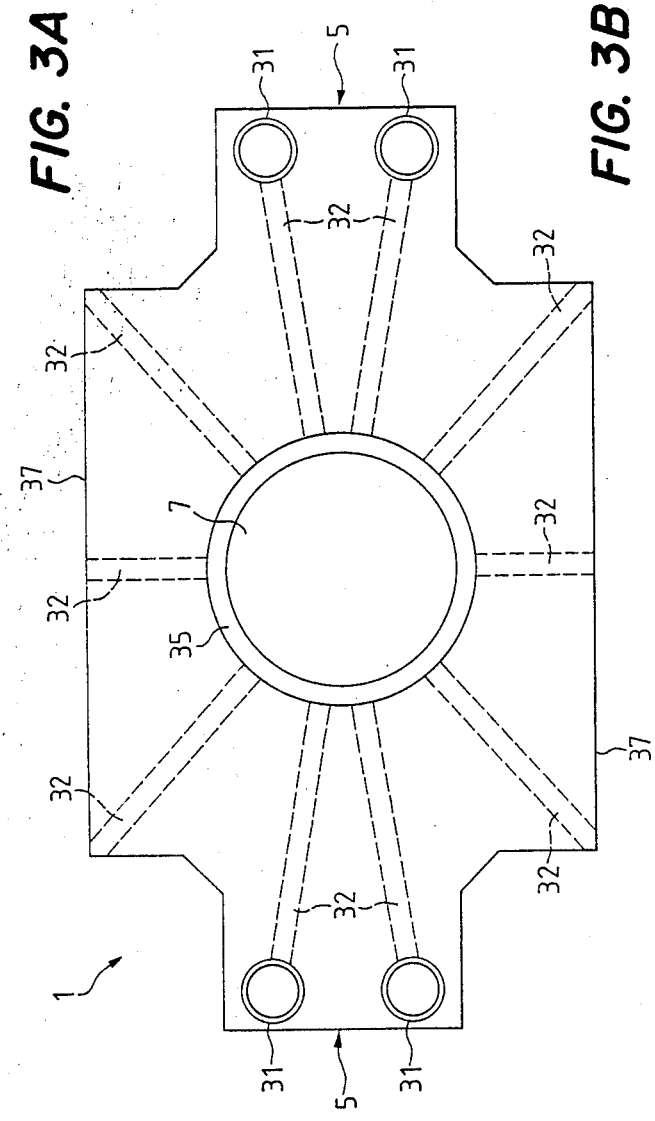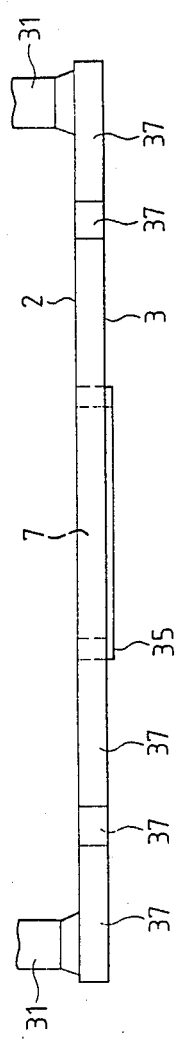

MULTIPURPOSE CHASSIS FOR COMMERCIAL AND SPECIAL VEHICLES

The Invention relates to a multipurpose chassis according to the preamble of claim 1.

BACKGROUND OF THE INVENTION

Very robust chassis are required for commercial and special vehicles which have to carry considerable weight, such as e.g. weapon transporters, mobile radar stations, mobile satellite control stations and mobile cranes. If use is made of units having considerable overall height, there is a risk of inadequate vehicle stability if the center of gravity thereof is too high above the road or terrain. Therefore there is a need for using very flat chassis, which are also able, by means of special suspensions, to be mounted at a low level. In addition, such vehicles are exposed to high loads and stresses, specially when used in uneven terrain and therefore require a stable and extremely robust chassis construction. Particularly high loads occur if ground unevenness with small spring deflection can only partly be compensated. In order to increase maneuverability, such vehicles also require a maximum obliquity of the wheels.

Conventional chassis constructions normally use two supporting main spars or a central tube as carrying elements. A loading bridge made from wood, steel or aluminum is built on to those elements, normally by means of cross-beams fitted thereto. Therefore such a chassis has considerable overall height and, in addition, the connection of the chassis to the axles, which carry the structure, conventionally takes place by means of flat springs or flat spring sets which are responsible for axle guidance and suspension.

An important disadvantage of this type of construction is that the assembled elements result in a high superstructure which consequently has limited travelling stability. The loading surface is too high, so that it is not possible to install thereon units, such as e.g. radar stations, weapon transporters, mobile cranes, etc. With the conventional construction, it is also impossible to integrate vertical adjustment, slope adjustment or horizontal levelling. It is also disadvantageous that the construction with two spars offers limited resistance to torsional stresses due to that construction and is only able to hold heavier loads in an inadequately stable manner. Said construction also only permits very limited steering angles of approximately 15° to 20°.

An object of the present invention is to provide a multipurpose chassis which avoids the aforementioned disadvantages even under high loads and stresses and, when used in open terrain, has high stability, particularly against torsion or twisting and, while avoiding laminated or leaf springs and even when using large wheels, permits considerable obliquity thereof and a very low-lying loading surface. It can be used together with space-saving telescopic axle suspensions and therefore, apart from the aforementioned adjustment possibilities, also permits the mounting of heavier units.

SUMMARY OF THE INVENTION

Briefly described, the invention comprises a multipurpose chassis for commercial and special vehicles comprising upper and lower carrier plates each having a central opening, a reinforcing ring fixedly attached to the upper and lower plates substantially aligned with the opening, first and second pairs of guide tubes fixedly attached to one of the plates at opposite ends of the chassis for receiving suspension apparatus, the longitudinal axes of the guide tubes being substantially perpendicular to its attached plate, and a plurality of elongated reinforcement members extending between and being fixedly attached to the upper and lower carrier plates and being attached at one end to the ring, each reinforcement member having a cross-section shaped to support loads and stabilize the chassis, the reinforcement members extending generally radially from the reinforcing ring toward the edges of the plates with four members extending diagonally, two members extending generally perpendicular to a normal direction of motion of the chassis and four members extending between and being attached at opposite ends to the ring and the guide tubes.

The chassis has a so-called box-frame construction. It comprises a lower and an upper carrier plate, which are reinforced and joined by reinforcing or stiffening elements located between them. This leads to an enormous loading capacity and to extremely high rigidity with respect to twisting, whilst the height of the chassis is limited. Compared with conventional chassis constructions with an overall height of 30-40 cm, minimum heights of approximately 10 cm are possible with the invention. This permits use in conjunction with vehicles, which have to carry and transport heavy loads over uneven ground. The inventive chassis permits steering angles of 45°, which greatly increases maneuverability compared with conventional constructions. Another advantage is that the arrangement of the stiffening elements can take place in such a way that the entire chassis and in particular also the marginal areas has considerable strength and can withstand high loads. By covering the outer faces of the chassis with vertical cover plates, additional reinforcement is obtained. These measures permit a configuration which, even when using large wheels, allows very low mounting or suspension of the chassis and also permits, in the marginal area thereof, attachment of heavy components. As a result of the inventive chassis, it is possible to use telescopic axle suspensions, such as are described, e.g., in Swiss patent application 531/87, which permit adjustment of the vehicle position, even when travelling and without additional means. In addition, a construction with relatively low weight is obtained. As the chassis is preferably closed all-around, it has high resistance to external influences.

BRIEF DESCRIPTION OF THE DRAWINGS

The invention is described in greater detail hereinafter relative to embodiments and the attached drawings, wherein:

FIG. 2 is a side view of the multipurpose chassis according to FIG. 1;

FIGS. 3A and 3B are top plan and side elevation views, respectively of an embodiment of a multipurpose with an opening in the central area and a welding, solid steel ring from above and from the side;

FIG. 4 is a driver's cab, which can be fixed to the ends of a chassis according to FIG. 1;

FIG. 5 is an embodiment of a reinforcing element in cross-section; and

DETAILED DESCRIPTION OF THE PREFERRED EMBODIMENTS

Figure 1:
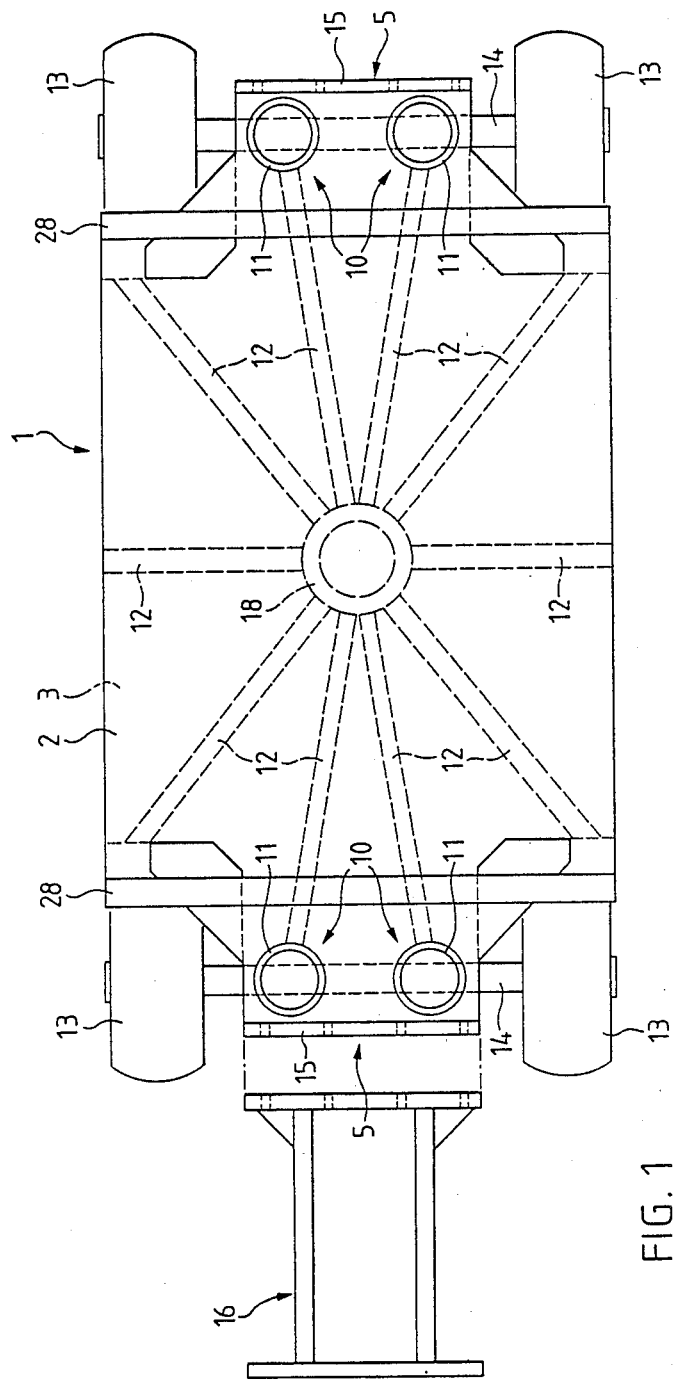
FIG. 1 is a plan view of an inventive embodiment of a multipurpose chassis with axle suspension and wheels.

FIG. 1 is an embodiment of the inventive multipurpose chassis in a view from above. The chassis platform is formed by lower and upper carrier plates 2 and 3 between which are located reinforcements 12. Thus, the inventive chassis simultaneously fulfills the function of the loading surface, which leads to a saving in both weight and space. Compared with conventional chassis constructions with overall heights of 30-40 cm, said novel chassis easily makes it possible to achieve heights below 20 cm and even down to approximately 10 cm. As a result of the lightweight, space-saving and robust construction of the chassis, particularly with respect to torsions occurring during travelling, it is possible to use telescopic axle suspensions 10, such as are e.g. described in Swiss patent application 531/87. By means of such telescopic axle suspensions 10 with shock absorbic-like axle guidance elements, which are guided in guide tubes 11, the axles 14 are suspended and on them are mounted wheels 13. The use of telescopic suspensions permits the arrangement of said means over the loading surface and consequently allows low mounting of the chassis 1 or loading surface. The high loads caused by a hard suspension and the limited spring displacement, can be absorbed as a result of the extremely stable construction of the inventive chassis. The guide tubes 11 are in each case fixed to the chassis 1 and project vertically or virtually vertically upwards. As high acceleration forces act on the axle suspensions in the case of heavy vehicles, particularly when braking and starting, the guide tubes 11 simultaneously offer stability with respect to such loads.

Without additional elements, the use of such an axle suspension permits a suspension of the vehicle, adaptation to slope, vertical adjustment and horizontal levelling.

The necessary chassis stability is achieved by several reinforcing profiles 12 passing between the two carrier plates 2, 3. Emanating from a central steel ring 18 in the central region of the chassis, these reinforcing profiles 12 pass radially toward the marginal regions of said chassis. Both the reinforcements 12 and the steel ring 18 are welded to the two carrier plates 2, 3. The width of chassis 1 is reduced at the front and rear ends 5, so that there is a sufficiently large swiveling and steering range for large wheels 13. Unlike in the case of conventional chassis with their standard frames and suspensions, the present platform chassis allows the large wheels to rotate completely under the platform. In order to achieve even greater spring travel, the aforementioned taper is provided. Thus, even with considerable spring travel, all the wheels can be swivelled up to approximately 45°. As the reinforcements 12 extend against ends 5, the chassis 1 also has sufficient strength in those areas. Moreover, as a result of this arrangement of the reinforcements 12, the loads which mainly occur in conventional circumstances in the vicinity of the chassis center are transferred in an optimum manner to the axle suspension and wheels. In order to distribute the load resting on the loading surface as uniformly as possible over the entire chassis and in order to achieve an optimum load transfer to the wheel axles of the radially outwardly directed reinforcements 12 which emanate from steel ring 18 and are fixed thereto, four reinforcements are directed diagonally, two at right angles to the chassis and four passing to the guide tubes 11, to which they are firmly connected.

Preferably front panels or plates 15 are in each case connected vertically or at a small angle with respect to the carrier plate planes to the ends 5 of chassis 1. It is possible to screw thereto, e.g. an engine mounting frame 16. It is also possible to fix or couple to panels 15 other means, such as e.g. driver's cabs, trailer means, etc. This design permits a use of the chassis both as an automotive vehicle with its own engine unit and also as a trailer. In combination it is possible to use it as a towing vehicle with a trailer.

FIG. 2 is a side view of such a chassis. The broken lines indicate the wheels 23, axles 22 and shock absorber legs 30. The guide tubes 21 for the spring suspension are vertically welded to the chassis. Since, as stated, enormous forces act on guide tubes 21 when braking or starting, they are supported by support structures 27, 28, 29 located above the chassis 1. These support structures ensure that the forces occurring during these loads are uniformly transferred to the chassis.

These support structures in each case comprise a rigid plate 29, two lateral, sloping plates 27 and a transition piece 28. The front ends of the plates 29 simultaneously support the two front panels 25, which are fixed vertically to the chassis end face. These support structures 27, 28, 29 stabilize the guide tubes 21 and simultaneously serve as load transfer means from the platform formed by the chassis 1 to the elements of the axle suspension. As can be gathered from FIG. 1, plates 27 and 29 are shaped in such a way that the wheels 23 are not impeded during swinging in and steering. Transition piece 28 comprises a square tube, which interconnects the plates and which transfers the forces emanating from guide tubes 11 from plate 29 to plates 27 and chassis 1. As considerable forces also act on those support structures, plates 27, 29 are preferably also constructed on the basis of a rigid box frame construction.

Figure 6:
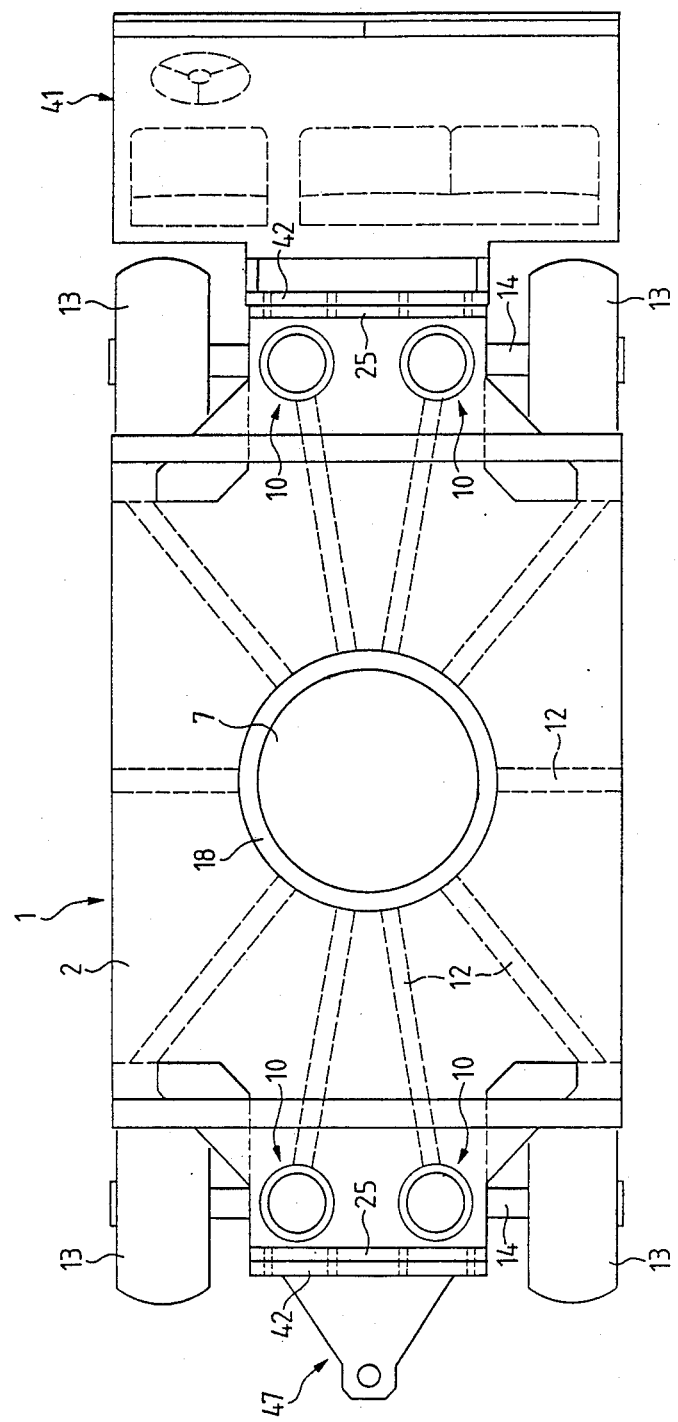
FIG. 6 is an embodiment of a vehicle with an inventive chassis, fitted driver's cab and a trailer means.

FIG. 3 shows an embodiment of an inventive chassis with a steel ring 35 placed in the center and viewed from above and the side. This steel ring 35 is used for fitting a ring mount (not shown), turntable or pivoted bogie on chassis 1. Such pivoted bogies are in particular used with weapon transporters and mobile radar stations. The two carrier plates 2, 3 have corresponding openings 7, which are defined by steel ring 35. Thus, a downward passage is ensured for special superstructures with rotary distributors and other units. For other purposes, if necessary, the opening corresponds to front panel 25 on which are mounted the engine and other components for force transfer to the drive. If, as shown in FIG. 6, use is made of a trailer or attachment means 47, it is e.g. also possible to couple a second vehicle unit to a drive means, which drives both vehicles. In such a version the two successive vehicles form a unit or a vehicle with four axles which doubles the load carrying capacity.

As the inventive multipurpose chassis has a symmetrical construction, it is particularly suitable for vehicles which are to be used in both directions of travel. Both the wheel axles are mounted on the chassis in a steerable manner by means of the axle suspension or the wheels can optionally be pivoted with respect to the axle. The ends 5 of the chassis are tapered in such a way that both axles can be pivoted or the wheels turned in or cramped. Such a vehicle is steered by means of individual, parallel or opposite direction steering of the axles or wheels.

As described hereinbefore, the cross-sectionally V-shaped reinforcements 12, 32, 51 are preferably arranged radially emanating from the central area of the chassis. For special uses with other loads, other cross-sections of the reinforcements or a problem-specific arrangement of said reinforcements 12, 32, 51 may be necessary. For example, it is possible to also use double-T sections, wherein the web thereof is parallel to the carrier plate planes and the chords are in each case welded to the two carrier plates 2, 3.

In place of a central steel ring 18, 35, it is also possible to use some other reinforcing element, or this can be completely omitted.

Although as a result of its construction the chassis is suitable in optimum manner for use with telescopic axle suspensions, it is naturally also possible to use other spring suspensions or axle fixtures.

What is claimed is:

1. A multipurpose chassis for commercial and special vehicles comprising upper and lower carrier plates (2,3) each having a central opening at a central region thereof;

a reinforcing ring (18,35) fixedly attached to said upper and lower plates at said central region substantially aligned with said opening;

first and second pairs of guide tubes (11, 21, 31) fixedly attached to said upper plate at opposite ends of said chassis for receiving suspension apparatus, the longitudinal axes of said guide tubes being substantially perpendicular to said upper plate; and a plurality of elongated reinforcement member (12, 32, 51) extending between and being fixedly attached to said upper and lower carrier plates and being attached at one end to said ring, each said reinforcement member having a cross-section shaped to support loads and stabilize said chassis, said reinforcement members extending generally radially from said reinforcing ring toward the edges of said plates with four said members extending diagonally, two said members extending generally perpendicular to a normal direction of motion of said chassis and four said members extending between and being attached at opposite ends to said ring and said guide tubes.

2. A chassis according to claim 1 and further including connection means (15, 25) attached to both ends (5) of said chassis for coupling said chassis to auxiliary equipment.

3. A chassis according to claim 1, characterized in that the upper and lower carrier plates (2, 3) are interconnected at their edges by cover plates (37), so that the gap is sealed off with respect to the environment.

4. A chassis according to claim 1 characterized in that each of said upper and lower carrier plates (2, 3) is reduced in width at its two ends (5) to provide turning space for wheels (13) of a vehicle including said chassis (1).

5. A chassis according to claim 1 wherein each of said reinforcement members (51) is generally V-shaped in cross-section and is rigidly joined to said plates (2, 3) by welding seams.

6. A chassis according to claim 1 and further comprising support structures (27, 28, 29) for stabilizing and supporting free ends of said guide tubes (11, 21, 31), said support structures being connected to and supported with respect to said chassis (1).

* * * * *